United States Patent [19]

Zemanek, Jr.

[11] Patent Number: 4,516,228

[45] Date of Patent: May 7, 1985

[54] ACOUSTIC WELL LOGGING DEVICE FOR DETECTING COMPRESSIONAL AND SHEAR WAVES

[75] Inventor: Joseph Zemanek, Jr., Dallas, Tex.

[73] Assignee: Mobil Oil Corporation, New York, N.Y.

[21] Appl. No.: 526,199

[22] Filed: Aug. 25, 1983

[51] Int. Cl.$^3$ ............................................. G01V 1/40
[52] U.S. Cl. ................................... 367/75; 367/912; 367/180; 367/160; 367/25; 310/331; 181/104
[58] Field of Search ..................... 367/31, 28, 34, 38, 367/25, 75, 27, 48, 180, 912, 160, 161, 140; 181/104; 310/331, 333, 337, 332

[56] References Cited

U.S. PATENT DOCUMENTS 3,187,300  6/1965  Brate .................................... 310/331
3,276,533 10/1966  Pickett et al. ......................... 367/34
4,383,308  5/1983  Caldwell .............................. 367/31

FOREIGN PATENT DOCUMENTS 31989  7/1981  European Pat. Off. ............. 367/31

OTHER PUBLICATIONS

*Quantitative Seismology Theory and Methods*, vol. 1, by K. Aki and P. G. Richards, W. H. Freeman and Company.

*Elements of Acoustical Engineering*, by Harry F. Olson, D. Van Nostrand Company, Inc., 2nd printing.

"A New Method for Shear-Wave Logging", *Geophysics*, vol. 45, No. 10, Oct. 1980, pp. 1489–1506, by Choro Kitsunezaki.

Primary Examiner—Nelson Moskowitz
Assistant Examiner—Ian Lobo
Attorney, Agent, or Firm—A. J. McKillop; Michael G. Gilman; George W. Hager, Jr.

[57] ABSTRACT

A borehole logging system employs a compressional wave transmitter and a shear wave transmitter. The transmitters are alternately fired to impart compressional and shear waves into the formations surrounding the borehole. A bender-type receiver, spaced apart from the transmitter in the borehole is alternately gated so that the voltages across its pair of piezoelectric planar surfaces are subtracted during the expected time period of symmetrical motion of the receiver to provide a compressional wave output and added during the expected arrival time period of unsymmetrical motion of the receiver to provide a shear wave output.

1 Claim, 14 Drawing Figures

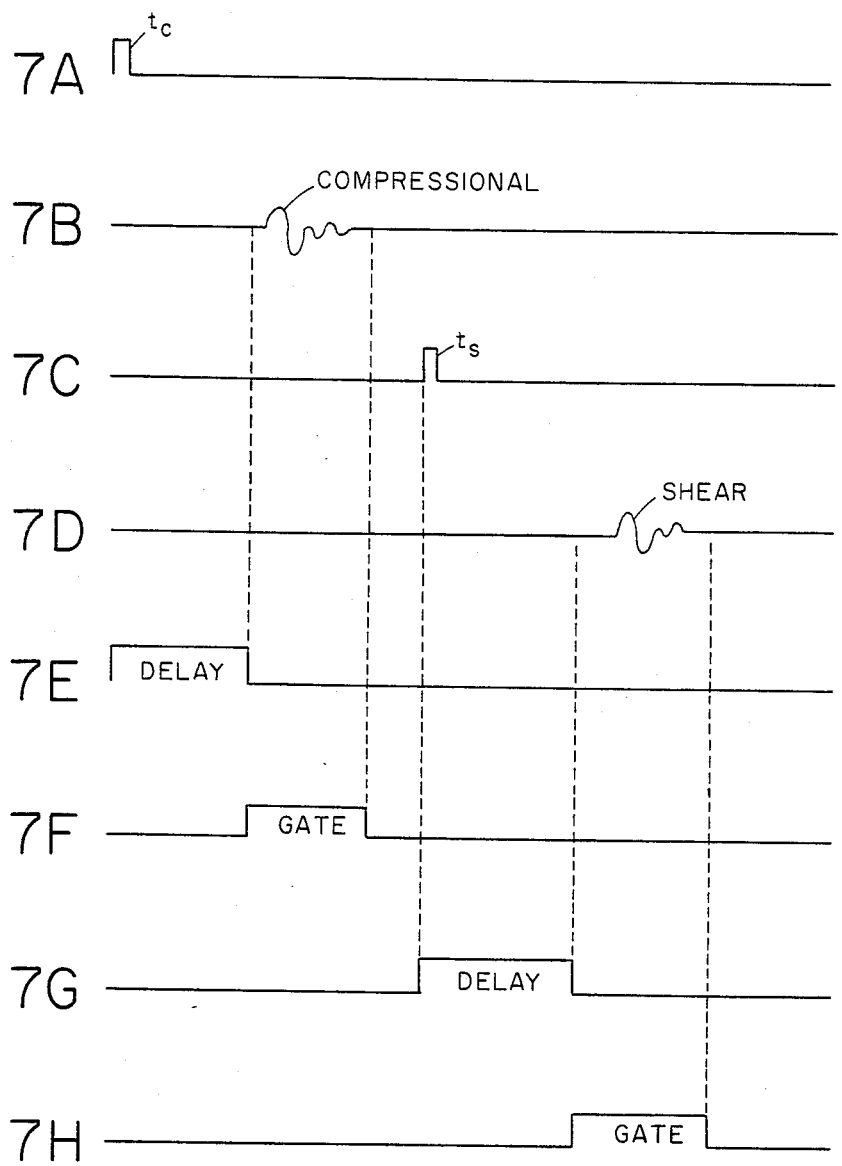

ACOUSTIC WELL LOGGING DEVICE FOR DETECTING COMPRESSIONAL AND SHEAR WAVES

BACKGROUND OF THE INVENTION

It has long been known to acoustically log open wellbores to determine the velocities of compressional waves and shear waves traveling through rock formations located in the wellbore region. Logging devices have been used for this purpose which normally comprise one or more transmitters and one or more receivers disposed at preselected distances in the wellbore.

By timing the travel of compressional waves, shear waves, and/or tube waves between the transmitters and receivers, it is normally possible to determine the nature of surrounding rock formations. In logging loosely consolidated formations, however, it is often difficult to distinguish between compressional, shear, tube and secondary waves which may comprise portions of a wave train arriving at a given receiver. Remotely spaced, multiple receivers have been used to aid in distinguishing between arriving wave fronts and from noise in the system. Multiple receivers permit the recognition of similar wave patterns and wave fronts which are received at each successive receiver. Since travel time differentials increase with increasing distance from the transmitter source, wave fronts and patterns which are closely spaced at proximate receiver locations will separate by the time of their receipt at remote receiver locations.

Various signal timing and wave front analysis methods have also been used for distinguishing between wave fronts received at a given receiver. Most of these methods involve timing circuits which anticipate the receipt of, and facilitate the collection of, such wave front information. For descriptions of various logging techniques for collecting and analyzing compression wave, shear wave, tube wave, and secondary wave data, reference may be made to U.S. Pat. Nos. 3,333,238 (Caldwell), 3,362,011 (Zemanek, J. R.) and U.S. No. Reissue 24,446 (Summers).

In the design of logging tools, various types of transmitters, such as, piezoelectric or magnetostrictive transmitters, have been suggested for creating acoustic logging signals. For conventional logging operations, most such transmitters have been centrally located in the borehole, and have been adapted to generate sound which is radiated in a multidirectional (360°) pattern from the transmitter to adjacent wellbore surfaces. Such transmitters are well suited for creating compressional waves in surrounding rock and sand formations.

Since compressional waves travel faster than those shear, tube or secondary waves which may also be produced by a multidirectional transmitter, calculation of compressional wave velocity is accomplished by presuming the the first arriving wave front or wave pattern is that of a compressional wave. In loosely consolidated formations, subsequent arrivals of shear waves are difficult to distinguish. In such formations, multidirectional transmitters tend to generate compressional waves of much greater amplitudes than any shear waves also produced thereby. Recognition of shear wave arrivals, is thus particularly difficult. Compressional and shear waves propagate along critical angle refraction paths. If the shear wave velocity in unconsolidated formations in less than the velocity in the wellbore liquid (e.g. drilling fluid, water or oil), then there is no critical angle refraction path for the shear wave and no shear wave is generated at the wellbore liquid interface.

Recently, attention has been directed to developing transmitters which are particularly suited to shear wave logging. Such transmitters, generally termed bender-type transducers, attempt to achieve a single point-force application of sound energy to the borehole wall. The theory behind point-force transmitters, as generally outlined in "A New Method for Shear Wave Logging", by Choro Kitsunezaki, Oyo Technical Note RP-4101, Oyo Corporation, Urawa Saitama 336 Japan (October, 1978) is that they are capable of directly generating shear waves. Conventional multidirectional transmitters are said to be capable only of indirectly creating shear waves in accordance with a critical angle refraction path process. Accordingly, point force type transmitters produce shear waves of substantially higher amplitudes than heretofore possible with conventional multidirectional compressional wave transmitters. Accordingly, formations, such as loosely consolidated sand, which do not propagate shear waves in sufficient amplitudes to permit definitive detection or unconsolidated sand which do not permit propagation of shear waves using conventional compressional wave transducers, may now be shear wave logged with these shear wave logging systems. Oyo Technical Notes RP-4105, entitled "Development of a Suspension Type S-Wave Log System", by Kimio Ogura (November 1979) and RP-4125, entitled "Development of the Suspension S-Wave Logging System (Report No. 2)", by Kimio Ogura, et al (November 1980) provide additional information relating to shear wave logging systems.

BRIEF DESCRIPTION OF THE DRAWINGS

FIGS. 7A–7H illstrate timing diagrams associated with the operation of the control circuitry of FIG. 6.

SUMMARY OF THE INVENTION

The present invention is directed to a new and improved system for continuously logging both the compressional and shear wave transmission characteristics of formations surrounding a borehole. A well logging sonde including a multidirectional acoustic transmitter and a point force acoustic transmitter are lowered into the borehole. The multidirectional acoustic transmitter imparts compressional or symmetrical waveform motion into the formations. The point force acoustic transmitter imparts shear or unsymmetrical waveform motion into the formations. The transmitters are selectively triggered to alternately impart compressional and shear waves into the formation. The logging sonde also includes a receiver mounted in spaced relation from the transmitters. The receiver is a bender-type transducer having opposed unrestricted piezoelectric planar surfaces oriented along the longitudinal axis of the sonde. The output of the receiver is configured in response to the trigger pulse for exciting the multi-directional acoustic transmitter so that the voltages produced across each of the piezoelectric planar surfaces are combined for symmetrical motion of the receiver following the generation of a compressional wave by the multidirectional acoustic transmitter. Alternately, the output of the receiver is configured in response to the trigger pulse for exciting the point force transmitter so that the voltages produced across each of the piezoelectric planar surfaces are combined for unsymmetrical motion of the receiver following the generation of a shear wave by the point force acoustic transmitter.

More particularly, a first delay pulse is initiated by the triggering of the multidirectional acoustic transmitter and extends for a time period less than that expected for the generated compressional wave to travel through the formations to the receiver. Upon termination of the delay pulse, a gating pulse is produced and extends for a time period expected for the arrival of the compressional wave at the receiver. During this time period the output of the receiver is gated for subtraction of the voltages across each of the piezoelectric planar surfaces to produce the desired compressional or symmetrical waveform output.

A second delay pulse is initiated by the triggering of the point force acoustic transmitter and extends for a time period less than that expected for the generated shear wave to travel through the formation to the receiver. Upon termination of the delay pulse, a gating pulse is produced and extends for a time period expected for the arrival of the shear wave at the receiver. During this time period the output of the receiver is gated for addition of the voltages across each of the piezoelectric planar surfaces to produce the desired shear or unsymmetrical waveform output.

DESCRIPTION OF THE PREFERRED EMBODIMENT

Figure 1:
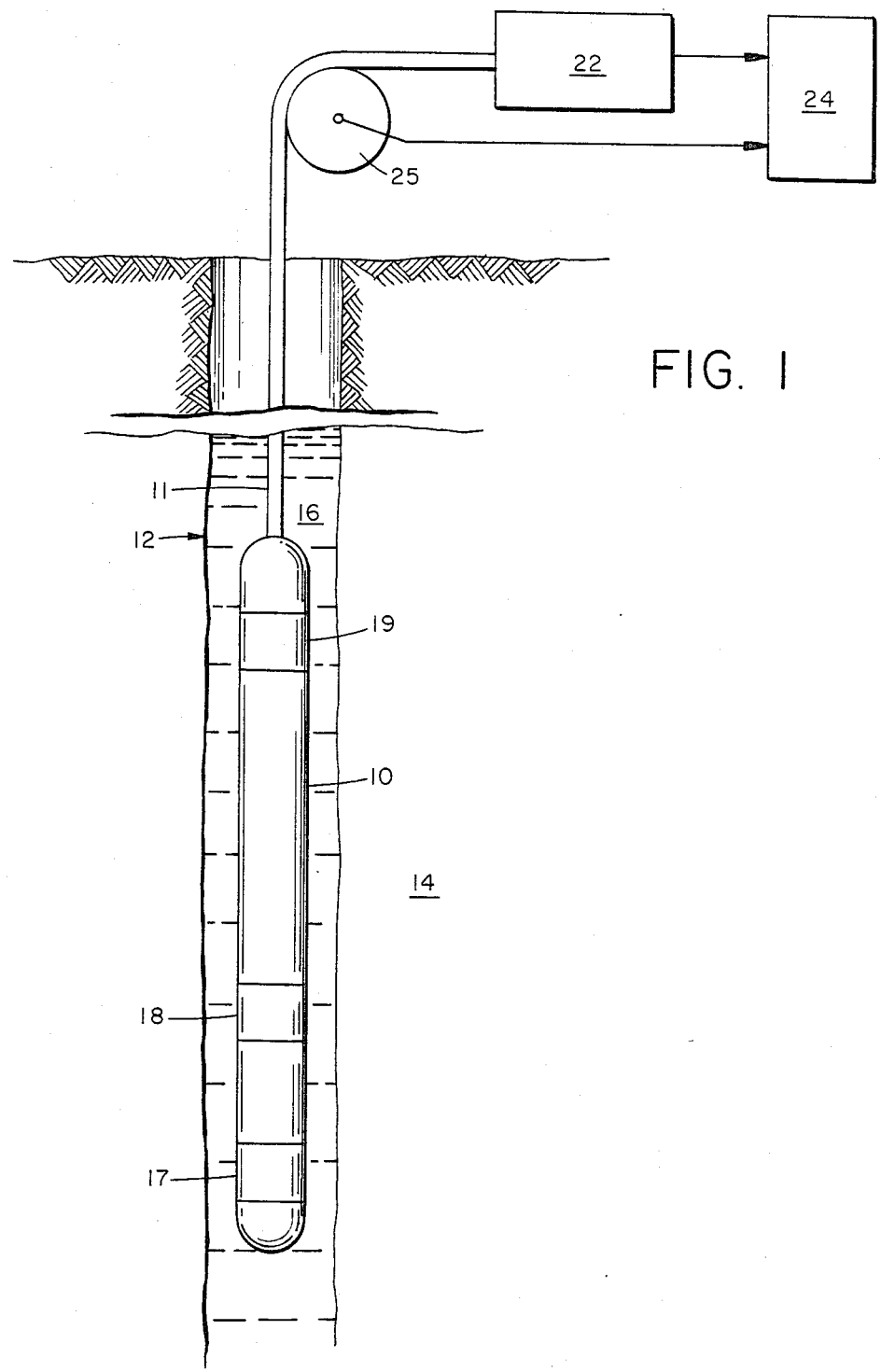
FIG. 1 illustrates a well logging system employing a logging tool disposed within a borehole for use in carrying out compressional and shear wave logging operations.

Referring to FIG. 1, there is illustrated an acoustic logging system embodying the improved logging tool of the present invention. The logging system includes an elongated logging tool 10 which is suspended from a cable 11 within a borehole 12 which traverses a subterranean formation of interest 14. Formation 14 may be a suspected oil or gas bearing formation which is to be characterized in regard to its porosity, fluid saturation, or such other information as may be desired. The well 12 is filled with a liquid such as drilling mud 16. The logging tool 10 comprises acoustic transmitters 17 and 18 and the acoustic receiver 19.

Signals from the logging tool 10 are transmitted uphole by the conductors in cable 11 to a utilization system comprising control circuit 22 and recorder 24. A depth indicating means, such as a measuring sheave produces a depth signal which is applied to the recorder 24 in order that the output from control circuit 22 may be correlated with depth.

Referring now again to the transmitters 17 and 18, transmitter 17 is a multidirectional, compressional-type transducer, while transmitter 18 is a point force (unidirectional), shear-type transducer. More particularly, the multidirectional transmitter 17 may be a piezoelectric or magnetostrictive transducer of the type known to the art for producing compressional waves in the formation surrounding the borehole. A compressional wave is a wave in which the motion or direction of displacement of the particles of the medium in which the wave travels is parallel to the direction of propagation of the wave. The point force transmitter 18 may be a bender type transducer of the type known to the art for producing shear waves in the formation surrounding the borehole. A shear wave is a wave in which the motion, or direction of displacement, of the particles of the medium in which the wave travels is perpendicular to the direction of propagation of the wave.

In order to measure the compressional and shear waves generated by the transmitters 17 and 18, the present invention provides for a single receiver 19 whose output is alternately configured for symmetrical (compression) and unsymmetrical (shear) motion. Transmitters 17 and 18 are alternately triggered to produce first a compressional wave and then a shear wave. At the time of the generation of the compressional wave, receiver 19 is configured to detect a symmetrical motion which is the nature or characteristic of the compressional wave. At the time of the generation of the shear wave, receiver 19 is reconfigured to detect unsymmetrical motion which is the nature or characteristic of the shear wave.

Figure 2:
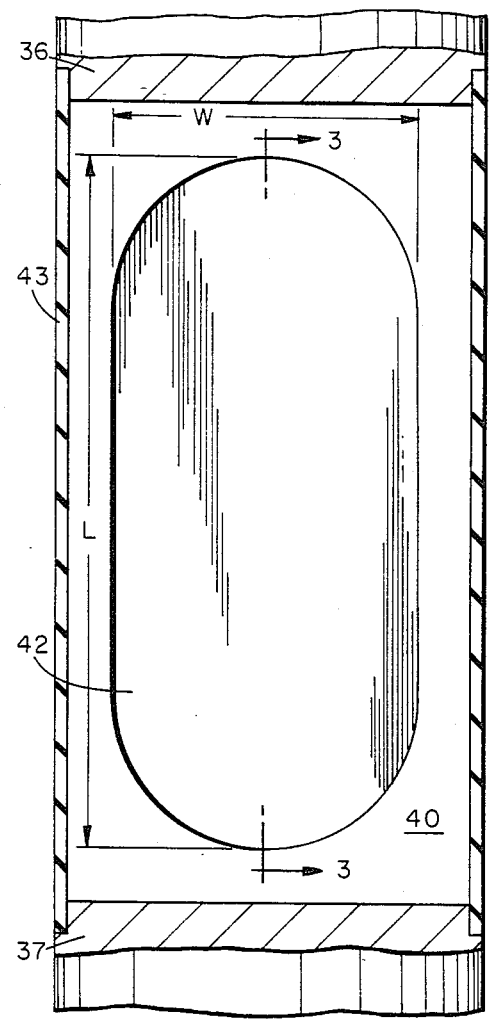
FIGS. 2 and 3 illustrate the single downhole receiver of the logging tool of FIG. 1 for alternately receiving compressional and shear wave acoustic signals.
Figure 3:
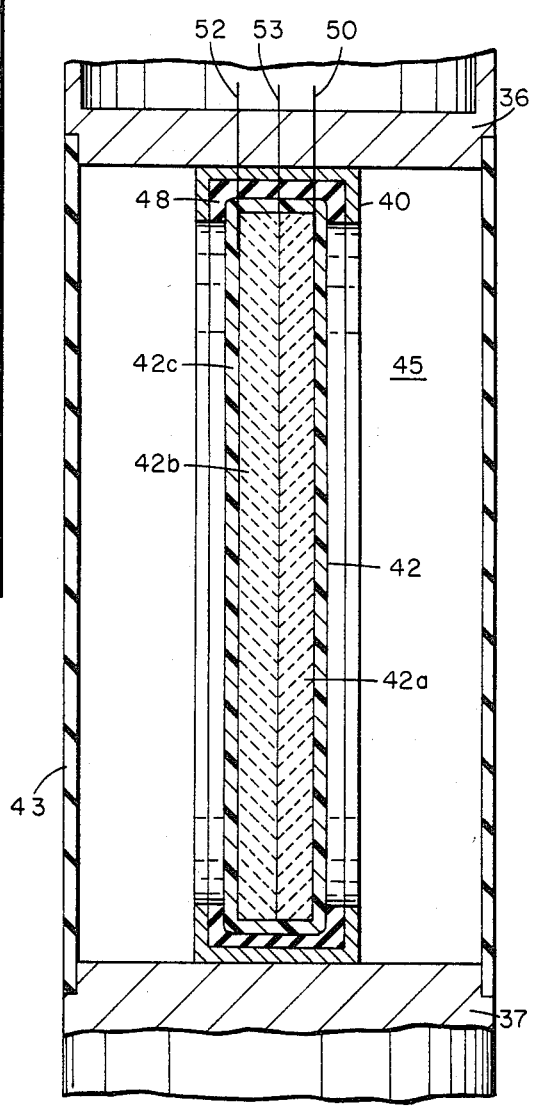

Receiver 19 is preferably a bender-type transducer shown in detail in FIGS. 2 and 3 along with the manner in which it is supported in the logging tool. Referring to FIG. 2, upper and lower panels 36 and 37, respectively, define a transducer compartment within the logging tool. Extending between the panels 36 and 37 is a transducer mounting bracket 40 which has an aperture therein which receives the bender-type transducer 42. The transducer compartment is provided with a peripheral window 43 which is relatively transparent to acoustic energy. The window 43 may be formed of any suitable material which has an acoustic impedance close to that of the well liquid in order to minimize reflections from the window. The transducer compartment is filled with a suitable coupling liquid as indicated by reference numeral 45 in FIG. 3 which also has an acoustic impedance close to that of the liquid within the borehole. For example, the window 43 may be formed of neoprene rubber and the coupling liquid 45 within the compartment may be a light motor oil.

The mounting of the bender-type transducer is shown in greater detail in FIG. 3. The transducer 42 comprises piezoelectric elements 42a and 42b which are bonded together and encased in a plastic potting compound 42c. The transducer is mounted in support 40 by means of rubber mounting ring 48 in order to reduce the transmission of acoustic energy directly from the transducer to the structural components of the well logging tool. Electrical leads 50 and 52 are bonded to the outer surfaces of the elements 42a and 42b, respectively. Lead 53 is bonded to the inner surfaces of elements 42a and 42b and serves as electrical ground. Leads 50, 52 and 53 extend through panel 36 and are carried by way of cable 11 to the uphole control circuit 22.

Figures 4, 5:
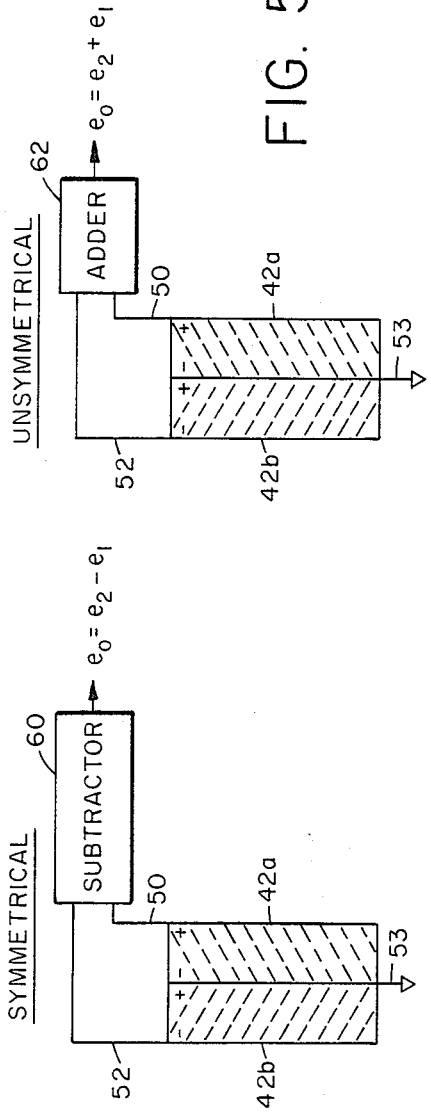
FIGS. 4 and 5 represent alternative configurations for utilizing the output from the single downhole receiver of FIGS. 2 and 3 to provide for the desired compressional and shear wave measurements.

As mentioned above, receiver 19 is alternately configured for symmetrical and unsymmetrical waveform reception. For example, following a compressional wave transmission by the transmitter 17, receiver 19 is to be configured as shown in FIG. 4 for symmetrical motion. In this configuration the voltages $e_1$ and $e_2$ generated by the equal and opposite flexures of the piezoelectric elements 42b and 42a, respectively, are subtracted by the subtracter 60 to produce the desired compressional wave output signal $e_o$. Following a shear wave transmission by the transmitter 18, receiver 19 is to be configured as shown in FIG. 5 for unsymmetrical motion. In this configuration the voltages $e_1$ and $e_2$ generated by the equal and opposite flexures of the piezoelectric elements 42b and 42a, respectively, are added by the adder 62 to produce the desired shear wave output signal $e_o$.

Figure 6:
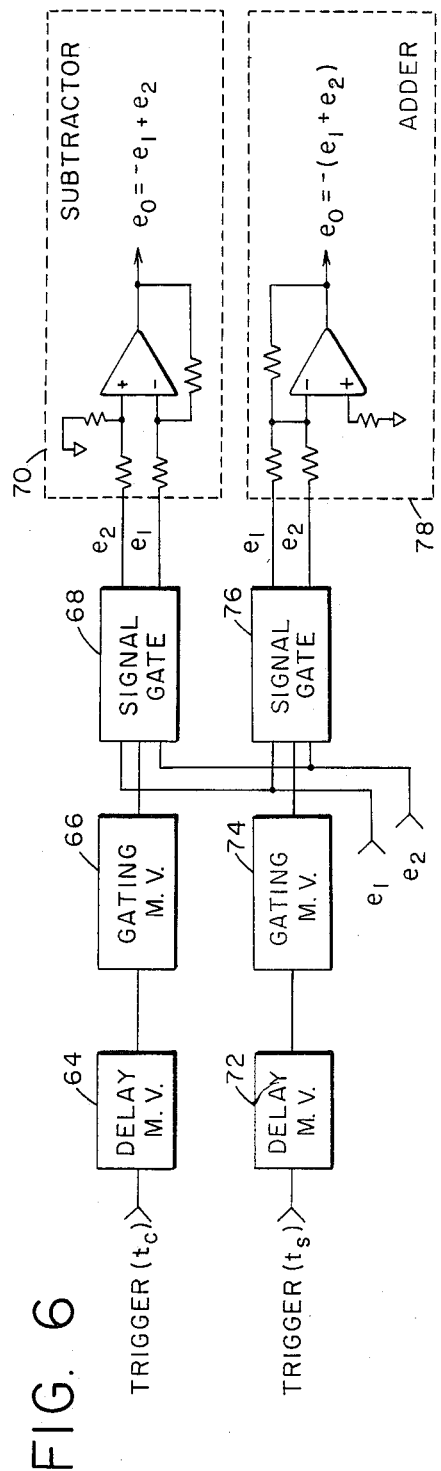
FIG. 6 illustrates the control circuitry of FIG. 1 utilized in reconfigure the output of the single downhole receiver to provide for the desired compressional and shear wave measurements.

In order to carry out the reconfiguration of the receiver 19 following each acoustic transmission so as to alternately reflect the two configurations of FIGS. 4 and 5 there is provided the uphole control circuitry 22 as illustrated in detail in FIG. 6 with associated timing diagram of FIGS. 7A-7H. In response to a trigger pulse $t_c$ (FIG. 7A) for energizing an acoustic wave transmission from the compressional wave transmitter 17, the delay multivibrator 64 is switched to a quasi-stable state for a time period (FIG. 7E) expected for the generated compressional wave to travel through the formation from the transmitter 17 to the receiver 19. Shortly before the expected arrival, multivibrator 64 returns to its stable state. At this time the output of multivibrator 64 triggers the gating multivibrator 66, which in turn generates a gating signal which encompasses the expected time period (FIG. 7F) during which the compressional wave (FIG. 7B) arrives at receiver 19. The output of the gating multivibrator 66 is applied to a signal gate 68 so that this gate passes the compressional wave signal across lines 50 and 52 from receiver 19 to the subtraction circuitry 70. In similar manner the delay multivibrator 72, gating multivibrator 74 and signal gate 76 pass the shear wave signal (FIG. 7D) across lines 50 and 52 from receiver 19 to the addition circuitry 78 following its travel time through the formation (FIG. 7G) and its arrival (FIG. 7H) at the receiver 19 after having been generated by the transmitter 18 in response to the trigger pulse $t_s$ (FIG. 7C). In carrying out the foregoing described operation the delay multivibrators 64 and 72 are preferably 74121, the gating multivibrators 66 and 74 are preferably 74121, and the signal gates 68 and 76 are preferably 5041. The subtractor 70 and adder 78 preferably include at least one operational amplifier to which the signals $e_1$ and $e_2$ are applied.

Having now described the present invention in connection with a preferred embodiment, it is to be understood that various modifications and changes may be made without departing from the spirit and scope of the invention as set forth in the appended claims.

I claim:

1. A well logging device for continuously logging both the compressional and shear wave transmission characteristics of formations surrounding a borehole comprising:
   (a) a multidirectional acoustic transmitter for imparting compressional waves into the formations surrounding the borehole,
   (b) a point force acoustic transmitter for imparting shear waves into the formations surrounding the borehole,
   (c) means for triggering said transmitters to alternately impart said compressional and shear waves into said formations,
   (d) a receiver mounted on said logging device in spaced relation from said transmitters, said receiver comprising a bender-type transducer having a single pair of opposed unrestricted piezoelectric planar surfaces, oriented along the longitudinal axis of said tool,
   (e) means initiated by the triggering of said multidirectional transmitter for producing a first gating pulse during the expected arrival time of a compressional wave at said receiver,
   (f) means responsive to said first gating pulse for subtracting the voltages produced across each of said piezoelectric planar surfaces of said receiver in response to a compressional wave,
   (g) means initiated by the triggering of said point force acoustic transmitter for producing a second gating pulse during the expected arrival time of a shear wave at said receiver, and
   (h) means responsive to said second gating pulse for adding the voltages produced across each of said piezoelectric planar surfaces of said receiver in response to a shear wave.

* * * * *